Feb. 5, 1963
Z. J. LANSKY ET AL
3,076,525
PULSE LUBRICATOR
Filed April 11, 1960
2 Sheets-Sheet 1
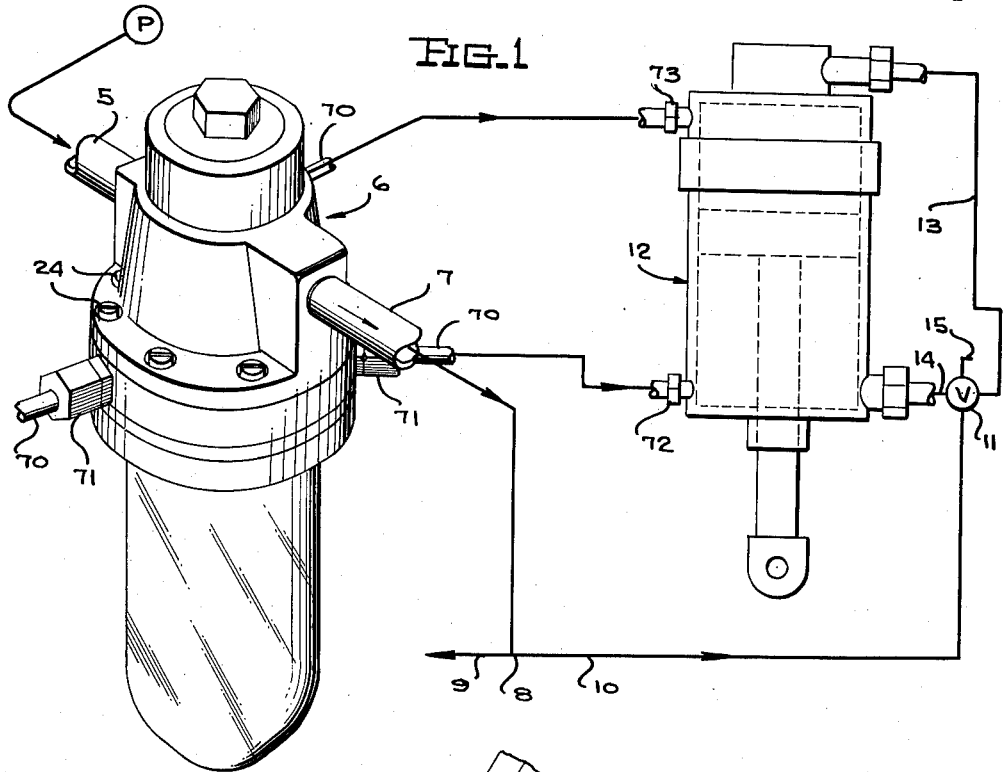
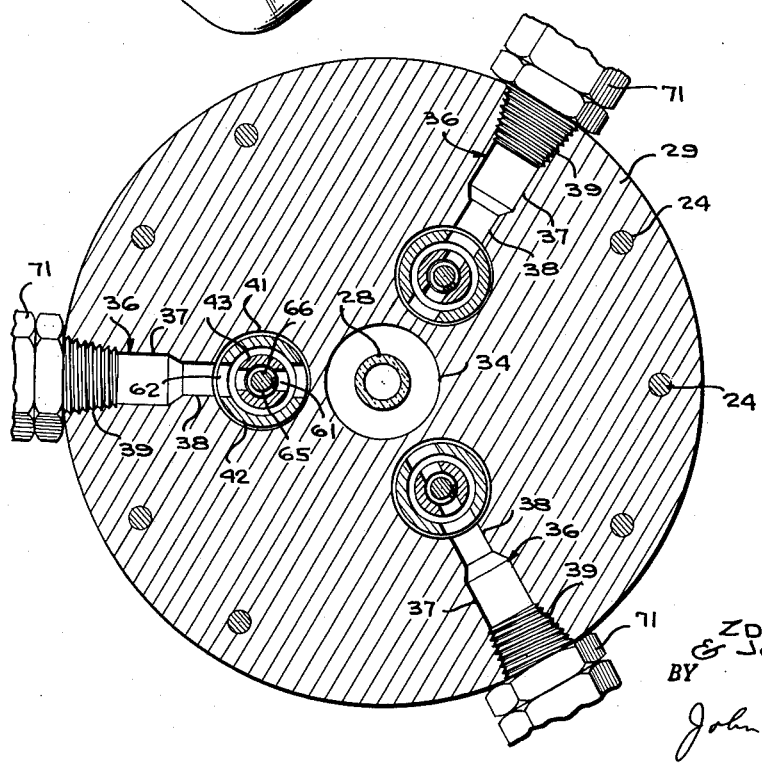
INVENTORS
ZDENEK J. LANSKY
& JOHN D. SCALBOM
BY
John N. Wolfram
ATTORNEY Feb. 5, 1963  Z. J. LANSKY ET AL  3,076,525
PULSE LUBRICATOR
Filed April 11, 1960  2 Sheets-Sheet 2

INVENTORS
ZDENEK J. LANSKY
& JOHN D. SCALBOM
BY
John N. Wolfrum
ATTORNEY

United States Patent Office 3,076,525
Patented Feb. 5, 1963

3,076,525
PULSE LUBRICATOR
Zdenek J. Lansky, North Riverside, and John D. Scalbom, Glenview, Ill., assignors to Parker-Hannifin Corporation, Cleveland, Ohio, a corporation of Ohio
Filed Apr. 11, 1960, Ser. No. 21,461
27 Claims. (Cl. 184—55)

This invention relates to new and useful improvements in lubricators for air motor systems or other air operated devices and more particularly relates to a lubricator which utilizes pressure in the system for directly forcing lubricant to a desired location in the system. The invention may be used either as an auxiliary lubricator in conjunction with a conventional lubricator of the type which introduces oil in finely divided form to the air line which provides motive power for the air motor system, in which case it serves as an auxiliary lubricator for supplying additional oil directly to any selected part of the system, or it may be used independently of such conventional lubricators.

The method of lubricating the moving parts of an air motor system by means of oil particles in the motive fluid is well known and a typical lubricator for accomplishing this is shown, for example, in Endebak et al. Patent 2,889,009. Although this method is satisfactory in many instances, it has certain deficiencies which make it desirable to provide additional lubricant in other instances. Thus, it is sometimes desirable to supply more lubricant to the motor than to the valve controlling delivery of pressurized air to the motor, or in the case of multiple motor systems it may be desirable to supply different amounts of lubricant to one motor than to another. Again, in some systems when sufficient lubrication is provided for one component a different component receives too much lubricant so as to result in waste and other attendant disadvantages.

It is an object of the present invention to provide a lubricator for an air motor system in which the lubricator may be connected to two points of the system and is responsive to a change in differential pressures between such points for causing lubricant to be delivered to one of the points.

It is another object to provide an auxiliary lubricator unit in conjunction with a conventional air line lubricator for supplying an additional amount of lubricant directly to a selected part of the air motor system.

It is another object to provide an auxiliary lubricator unit in conjunction with a conventional type of airline lubricator wherein both are supplied with lubricant from a common reservoir. Another object is to provide an auxiliary lubricator unit for supplying additional lubricant to a selected part of an air motor system, the auxiliary lubricator being usable in connection with a conventional air line lubricator and including a means for adjusting the rate of flow of such additional lubricant to the selected part without affecting delivery of lubricant by the conventional air line lubricator.

It is another object to provide an auxiliary lubricator unit for supplying additional lubricant to a selected part of an air motor system wherein the auxiliary lubricator unit may be mounted between the body and oil reservoir of a conventional air line lubricator for use in conjunction therewith.

It is another object of the invention to provide a pulse or intermittent flow type auxiliary lubricator unit for use in conjunction with a conventional airline lubricator wherein a change in the pressure differential between the air supply and the air motor is utilized for causing intermittent flow of additional lubricant to a selected part of the system.

Other objects and advantages of the invention will be apparent from the following description and from the drawings, in which:

FIG. 1 is a schematic view of an air motor system in which auxiliary lubricators in accordance with the present invention are used in conjunction with a conventional lubricator for supplying additional lubricant to selected parts of the air motor system.

FIG. 3 is a section view, taken along the lines 3—3 of FIG. 2.

Figure 2:
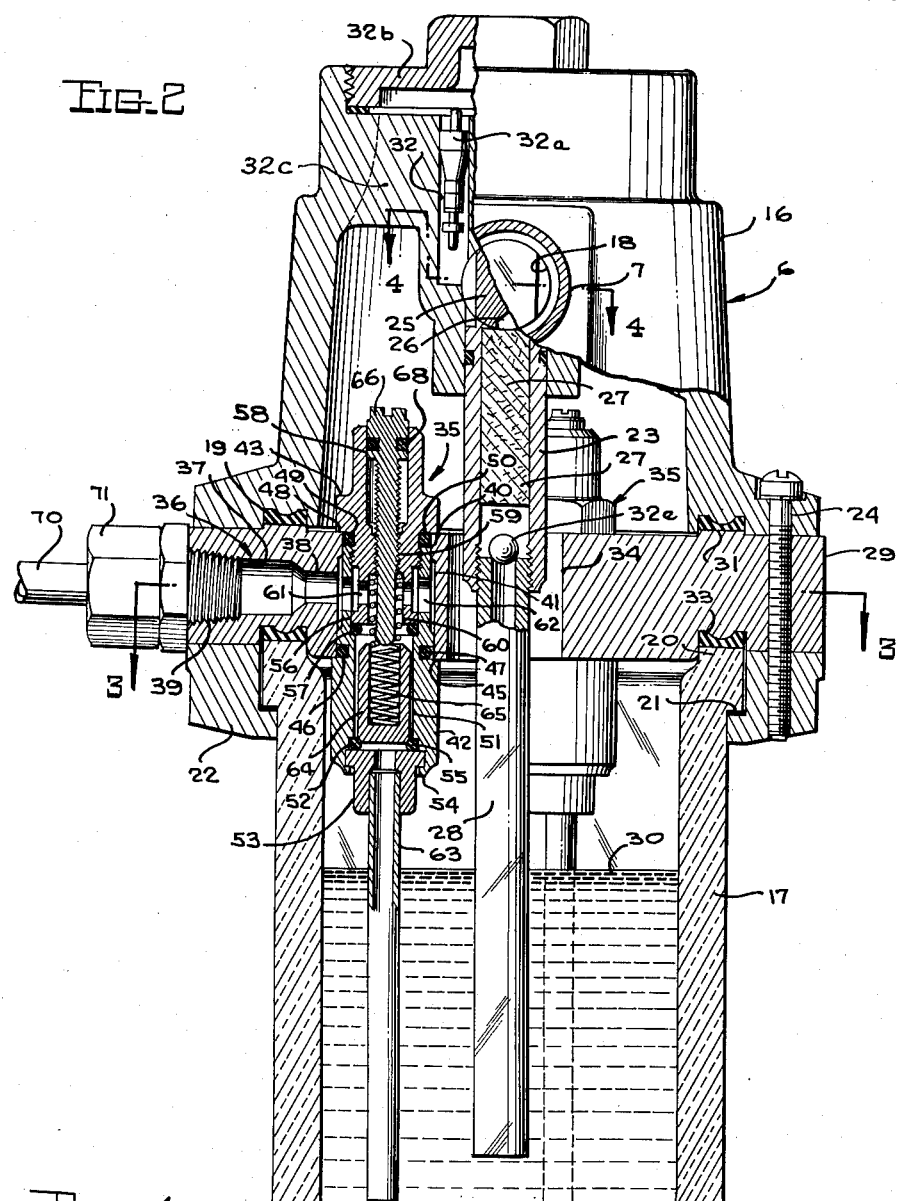
FIG. 2 is a view, partially in cross section, of a conventional type of lubricator with three auxiliary lubricators mounted therein.
Figure 4:
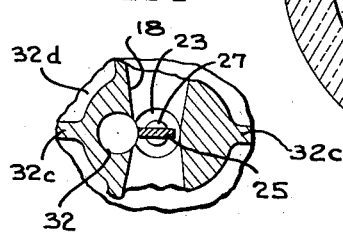
FIG. 4 is a fragmentary section view along the lines 4—4 of FIG. 2.

The air motor system shown in FIG. 1 includes an air supply pipe 5 leading from an air compressor P to a lubricator assembly generally designated 6. An air line 7 is also connected to the lubricator assembly 6 and receives air having lubricant mixed therewith in finely divided form from lubricator assembly 6. As shown, the air line 7 is branched as at 8 with one branch 10 leading to one control valve 11 and air motor 12. The other branch 9 leads to another air motor, not shown.

Air motor 12 is shown in the form of a double acting cylinder in which case the valve 11 is a conventional four way valve for alternately connecting lines 13 and 14 leading to opposite ends of the air motor to pressure line 10 and exhaust line 15 in the well known manner. The invention may, of course, be used with single acting cylinders and with other types of air motors or air actuated devices.

As shown in FIG. 2, the lubricator assembly 6 comprises body portion 16 and a reservoir 17 from a conventional type of lubricator, as for example, that shown in the above mentioned Endebak patent, to which an adaptor ring 29 carrying the auxiliary lubricators has been added.

In the conventional form of lubricator the reservoir 17 is attached directly to the body 16 with the upper rim 20 of the reservoir 17 sealingly engaged with gasket 19 carried by the body 16 and held thereagainst by means of a collar 22 which engages a shoulder 21 on the reservoir 17, the parts being held together by means of screws such as those indicated at 24 except of shorter length. However, in accordance with the present invention, the adaptor ring 29, which carries the auxiliary lubricators, is inserted as shown between the reservoir 17 and body 16, the adaptor ring having a tongue 31 projecting from its upper face for sealing against gasket 19 and carrying gasket 33 in a groove in its lower face for sealing against rim 20 of reservoir 17. The parts are held together as shown by collar 22 and screws 24 of proper length.

The body 16 contains conventional mechanism for causing oil from the reservoir to be introduced in small particle form to the pressurized air as the latter passes through passage 18 in housing 6, the opposite ends of passage 18 being connected to air supply pipe 5 and air line 7. This mechanism will now be briefly described.

As shown in FIG. 2, the body 16 has a central opening in which is mounted a cylindrical member 23 having a vane 25 at its upper end which projects into passageway 18. The member 23 and hence vane 25 are rotatable whereby the vane 25 acts as a valve member for varying the area of the flow path through passage 18. The lower end of the vane has an opening 26 therethrough which is exposed to the upper face of the porous plug 27 mounted within member 23. A pickup tube 28 is attached to the lower end of member 23 and extends through an opening 34 in ring 29 into the lubricating oil 30 contained within reservoir 17. Leading from passage 18 is another passage 32 which contains a check valve 32a of the type used in automobile tires. The check valve 32a is held in open position by contact of its stem with the lower end of cap 32b when the latter is assembled to body 16 as shown. Body 16 has a pair of webs 32c with openings 32d therebetween for establishing free communication between the upper and lower portions of body 16.

As air is introduced under pressure through pipe 5 into passage 18, it flows past vane 25, a portion of such air passing through opening 26, and discharges into air line 7. However a portion of the air from passage 18 is diverted into passage 32 and passes through check valve 32a and openings 32d into the interior of body 16 from which it makes its way through opening 34 into reservoir 17 to exert pressure on the upper surface of oil 30. This pressure forces oil up through tube 28 past check valve 32e and into contact with porous plug 27. The oil then filters through plug 27 and is picked up in finely divided form by the air passing through opening 26 from where it is carried by the air through air line 7 to the air motor system.

In the air motor system shown in FIG. 1, the oil supplied to the air flowing to the system through pipe 7 may be adjusted to the proper amount for lubricating valve 11 by turning of blade 25 to a selected position. The oil in the air passing through valve 11 which is not deposited in valve 11 for lubricating the same passes through pipes 13 and 14, as the case may be, and serves to partially lubricate air motor 12. However the amount of oil so reaching air motor 12 is often insufficient when the oil supply has been adjusted for proper lubrication of valve 11. The present invention overcomes this difficulty by providing the auxiliary lubricators heretofore mentioned. The auxiliary lubricators are carried by the adaptor ring 29 and are generally indicated by the numeral 35. Three of such auxiliary lubricators 35 are shown in the drawings but a lesser or greater number may be provided as may be required for the particular air motor system. The auxiliary lubricators 35 and the ring 29 may be referred to as an auxiliary lubricator unit.

For each auxiliary lubricator 35, the adaptor ring 29 is provided with a radial delivery port generally designated 36, each port 36 including a relatively large intermediate bore portion 37, a reduced inner bore portion 38, and a threaded outer portion 39. The inner portion 38 opens into a bore 40 extending vertically through the adaptor ring 29. The bore 40 has an enlarged lower portion to define an annular passage 41.

Each auxiliary lubricator 35 includes a lower body portion 42 and an upper body portion 43 which extend into the bore 40 and are connected together by a threaded connection 44. Thus, the body portions 42 and 43 clamp tightly against the upper and lower surfaces of the adaptor ring 29 for securely mounting the lubricator 35 thereon.

The body portion 42 has a shoulder 45 which abuts the underside of the adaptor ring 29. An annular recess 46 is formed in the lower body portion 42 immediately above the shoulder 45 and an O ring 47 of resilient material is disposed within the recess 46 to form a seal between the lower body portion 42 and the adaptor ring 29.

The upper body portion 43 has a shoulder 48 which abuts the upper surface of the adaptor ring 29. The upper body portion 43 is likewise provided with an annular recess 49 immediately below the shoulder 48. An O ring 50 is contained in the recess 49 for sealing between the upper body portion 43 and the adaptor ring 29.

The lower body portion 42 has a bore 51 terminating at its lower end in a stepped counterbore 52. A fitting 53 is seated in the stepped counterbore and is secured therein by means of an inturned flange 54 on the lower body portion 42.

The upper end of the bore 51 terminates in another counterbore 56. A lower part of the upper body portion 43 extends into counterbore 56 and engages a resilient O ring 57 to form a seal between the upper and lower body portions 43 and 42.

The upper body portion 43 has a bore 58 leading to a reduced diameter threaded bore 59 which terminates in an enlarged bore 60 which opens through the lower end of upper body portion 43.

The lower part of upper body portion 43 has a transverse bore 61 intersecting bore 60 and is in alignment with a transverse bore 62 in the upper part of lower body portion 42. The transverse bores 61 and 62 are also in alignment with bore 38 and annular recess 41.

An oil pickup tube 63 is attached to fitting 53 and extends downward into oil supply 30. Since the oil supply is under constant pressure due to the presence of pressurized air from supply pipe 5 acting on the upper surface thereof, oil is forced upward through pickup tube 63 to the auxiliary lubricator 35. In order to control the flow of oil through the lubricator, a valve member 64 is reciprocably mounted within bore 51 with a clearance therebetween which permits passage of oil from pickup tube 63 through bore 51 when the valve member is in an intermediate position. The valve member is formed with valve seats at its opposite ends for alternately seating against O rings 55 and 57 to shut off flow of oil through bore 51 when the valve member is at either end of its travel.

The upper portion of valve member 64 is hollow for receiving a coil spring 65. The upper end of spring 65 seats against a shoulder on adjusting screw 66 so that the pressure exerted by the spring upon valve member 64 can be varied by turning the adjusting screw. The upper end of the adjusting screw is sealed within bore 58 by resilient O ring packing 68, this packing also serving to frictionally lock the adjusting screw 66 in any selected angular position.

Threaded into each of the bores 39 is a suitable fitting 71 to which is attached an auxiliary oil line 70. One of the oil lines 70 is attached to a fitting 72 connected to one end of the air motor 12 and another oil line 70 is attached to an inlet fitting 73 connected to the other end of the air motor 12. During operation of the air motor system there is a continuous supply of air under pressure in pipe 5 and hence the oil in reservoir 17 is under constant supply line pressure. Air passing from supply line 5 through passage 18 and into air line 7 is constantly mixed with oil through the conventional air line lubricator mechanism, as already described. Except for minor pressure losses through the connecting lines and passages, the air pressures within the opposite ends of the air motor 12 at the time air under pressure is introduced to such ends is substantially the same as the pressure within the oil reservoir 17.

With the valve 11 in position for directing air under pressure from line 10 through line 13 to the upper end of air motor 12 and with the lower end of the air motor being exhausted through lines 14 and 15, and the upper end of air motor 12 will be pressurized for moving the piston downward, as viewed in FIG. 1. Just prior to the turning of valve 11 for directing air under pressure to the upper end of air motor 12, valve member 64 of the auxiliary lubricator 35 connected to fitting 73 will be in an upward position seated against O ring 57. Upon turning of the valve 11 for pressurizing the upper end of air motor 12, the pressure in such upper end of the air motor will be exerted through fitting 73 and the associated pipe 70 to the upper end of valve member 64 to substantially balance the oil pressure exerted on the lower end of valve member 64 and spring 65 will then move valve member 64 downwardly toward O ring 55.

As the valve member 64 moves downwardly, there will be substantially no flow of oil upwardly past the valve member because the pressures at opposite ends of valve member 64 are substantially equal at that time.

During the time that air under high pressure is being admitted to the upper end of motor 12, air in the lower end of the motor is under relatively low pressure because of the connection to exhaust line 15. Hence the pressure of oil at the upper end of valve member 64 of the particular auxiliary lubricator 35 which is connected to fitting 72 will also be relatively low. The associated valve member 64, which just prior to the turning of the valve 11 to the position described, has been in a downward position against its O ring 52, will now move upwardly against its spring 65 due to the influence of the relatively greater oil pressure acting on the bottom end of the valve member. Since the oil pressure at the bottom of this valve member 64 is greater than that at the upper end and in the associated passages leading to fitting 72, there will be a momentary upward flow of oil through the clearance between the valve member 64 and bore 51 and through the passages 61, 62, 36, tube 70, and fitting 72 into the lower end of air motor 12 for lubricating the same. This momentary flow occurs only during the time the valve member is moving from its lower to its upper position and will be cut off as soon as the valve member has completed its upward travel to seat against O ring 57.

It is apparent that the amount of oil which flows past valve member 64 as the latter is moving from seating engagement with O ring 55 into seating engagement with O ring 57 depends upon a number of factors, including the amount of clearance between valve member 64 and bore 51, the viscosity of the oil, the length of travel of valve member 64, the pressure differential on opposite sides of valve member 64, the pressure of the spring 65 upon valve member 64, and others. By providing an adjustment for any of these factors the amount of oil fed through the auxiliary lubricator during the upward stroke of valve member 64 can likewise be adjusted. In the form of the invention illustrated herein, the oil feed is regulated by adjusting the tension of spring 65 with adjusting screw 66.

In some instances it may be desirable to dispense with the conventional method of lubricating by means of finely divided oil particles in the air line and to supply lubricant only by direct means, that is, through lubricator 35. In such case the cylindrical member 23 and its associated parts, namely pickup tube 28, porous plug 27, and check valve 32e are omitted from the assembly so that no oil is forced into passage 18 for introduction into the air passing therethrough.

The principle of the invention may be also utilized in forms and systems other than those illustrated and described without departing from the true scope of the invention as defined in the following claims.

We claim:

1. In combination, a lubricator body, an oil reservoir, and an adaptor ring inserted between said body and oil reservoir, said adaptor ring having a port opening through the periphery thereof, and having a bore therein communicating with said port and with an oil pickup tube attached to said ring and extending into said reservoir, said bore being adapted to permit the flow of oil from said pickup tube to said port, and a valve member mounted within said bore for movement between a first position for closing said pickup tube and a second position for closing said bore relative to said port whereby flow of oil through said bore is controlled by said valve member.

2. A combination in accordance with claim 1 in which there is a clearance between said valve member and said bore for permitting flow of oil past said valve member when said valve member is in an intermediate position between said first and second positions.

3. In combination, a lubricator body, a reservoir containing oil, and an adaptor ring inserted between said body and oil reservoir, a plurality of independent passages through said adaptor ring, and a fluid pressure operated valve in each passage for controlling the flow of oil therethrough.

4. A lubricator assembly for an air operated system, said lubricator assembly including a body and an oil reservoir, a passage through which air under pressure may be directed to said system, means associated with said body for introducing oil from said reservoir in finely divided form into the air passing through said passage, means for introducing air under pressure from said passage into said reservoir for pressurizing the oil therein, said lubricator assembly also including an auxiliary lubricator adapted to directly connect said reservoir to a selected part of said system, said auxiliary lubricator being responsive to a change in differential pressures between the interior of said reservoir and said selected part for delivering oil from said reservoir directly to said selected part.

5. A lubricator assembly in accordance with claim 4 in which there is an adaptor ring between said body and said oil reservoir and said auxiliary lubricator is carried by said ring.

6. A lubricator assembly in accordance with claim 4 in which there is an adaptor ring between said body and said oil reservoir, and said auxiliary lubricator is adapted to connect said reservoir to said selected part through a port opening through the periphery of said adaptor ring.

7. A lubricator assembly in accordance with claim 4 in which there is a means for adjusting the flow of oil through said lubricator assembly independently of the amount of oil introduced into the air passing through said air passage.

8. A lubricator assembly in accordance with claim 4 in which there are separate means for independently adjusting the amount of oil delivered by the auxiliary lubricator and the amount of oil introduced into the air passing through said passage.

9. A lubricator assembly in accordance with claim 4 in which said lubricator assembly includes a plurality of said auxiliary lubricators each of which has a means for adjusting the flow of oil therethrough independently of the other auxiliary lubricators.

10. In combination, an air line lubricator, a source of air under pressure, a control valve, and an air operated motor, said air line lubricator having a passage therethrough, an inlet end of said passage being connected with said source of air under pressure, an outlet end of said passage being connected to said control valve, said control valve being connected to said air motor and being movable to one position for directing air under pressure from said lubricator assembly to one end of the air motor and being movable to another position for exhausting air from said one end of said motor, means associated with said air line lubricator for introducing oil in finely divided form into air passing through said passage whereby said air will carry said oil particles to said valve for lubricating the same, an oil reservoir, an auxiliary lubricator connected with said reservoir and to said one end of said air motor, means for connecting said source of air under pressure with said reservoir for pressurizing oil within said reservoir, said auxiliary lubricator being responsive to a change in differential pressures between said reservoir and said one end of said air motor for delivering oil from said reservoir directly to said one end of said motor.

11. A combination in accordance with claim 10 in which said auxiliary lubricator is mounted generally within said air line lubricator.

12. A combination in accordance with claim 10 in which said oil reservoir also supplied oil to said air line lubricator.

13. For use in an air motor system in combination with an air line lubricator, an auxiliary lubricator unit comprising an adaptor removably insertible between a lubricator body and an oil reservoir, said adaptor having spaced sealing surfaces, one for engaging the lubricator body and the other for engaging the oil reservoir, said adaptor also having a passage therethrough through which oil under pressure from the reservoir may be delivered to a place of use, said passage including a valve chamber having a single inlet port and a single outlet port, a fluid pressure operated valve member in said chamber and movable between two positions for alternately closing said ports to control flow of all fluid to and from said chamber, said ports being open when said valve member is between said closed positions, said valve member being responsive to a predetermined differential in the pressures of oil in said passage on opposite sides of said valve member for moving said valve member from one of said closed positions to the other.

14. An auxiliary lubricator unit in accordance with claim 13 in which said passage includes an opening through a peripheral wall of said adaptor.

15. An auxiliary lubricator in accordance with claim 13 in which said spaced surfaces are on opposite ends of said adaptor and said passage includes an opening in the peripheral wall of said adaptor between said surfaces.

16. An auxiliary lubricator unit in accordance with claim 13 in which said valve member is normally held closed in said one position by a spring.

17. For use in an air motor system in combination with an air line lubricator, an auxiliary lubricator unit comprising an adaptor removably insertable between a lubricator body and an oil reservoir, said adaptor having spaced sealing surfaces, one for engaging the lubricator body and the other for engaging the oil reservoir, said adaptor also having a passage therethrough through which oil under pressure from the reservoir may be delivered to a place of use, a fluid pressure operated valve member in said passage and movable between two positions for closing the same, said passage being open when said valve member is between said closed positions, said valve member being responsive to a predetermined differential in the pressures of oil in said passage on opposite sides of said valve member for moving said valve member from one of said closed positions to the other, said valve member being normally held closed in said one position by a spring and being moved by said predetermined fluid pressure differential to said other closed position at a predetermined rate whereby a predetermined amount of oil may be delivered past said valve member when the same is moving from said one closed position to the other, and said adaptor carries a means for adjusting the pressure of said spring for varying the rate at which said valve member moves from said one closed position to the other whereby the amount of oil delivered past said valve member while the latter is so moving may be varied.

18. An auxiliary lubricator unit in accordance with claim 13 in which said adaptor has a second passage therethrough independent of the first mentioned passage for connecting the interior of the lubricator body with the interior of the reservoir when said adaptor is inserted therebetween.

19. In combination, a lubricator body having a first sealing surface, an oil reservoir having a second sealing surface, an adaptor ring removably inserted between said lubricator body and said reservoir and having an upper sealing surface corresponding with said second sealing surface and a lower surface corresponding with said first sealing surface, said first and upper sealing surfaces and said lower and second sealing surfaces being engaged, said adaptor ring having a passage therethrough through which oil under pressure from said reservoir may be delivered to a place of use in said system, a fluid pressure operated valve member in said passage and movable between two positions for closing the same, said passage being open when said valve member is between said closed positions, said valve member being responsive to a predetermined differential in the pressures of oil in said passage on opposite sides of said valve member for moving said valve member from said one of said closed positions to the other, said first sealing surface and said second sealing surface being formed complementary to each other whereby the same are sealingly engageable with each other when said adaptor ring is removed from between said body and said reservoir.

20. In a fluid pressure system, an operating device and a dispenser, said dispenser having a reservoir containing a fluid, means for pressurizing said fluid, a conduit communicating said reservoir with said device, a valve seat in said conduit, a fluid pressure operated valve member in said conduit between said seat and said reservoir, said valve member having one side thereof exposed to pressure of fluid in said reservoir and another side exposed to pressure of fluid in said device, said valve being movable by the fluid pressure in said reservoir into engagement with said seat for closing said conduit when the pressure of fluid in said reservoir exceeds the pressure of fluid in said device.

21. A dispenser for use in a fluid pressure system, said dispenser comprising a housing defining a reservoir for containing a liquid, a first conduit in said housing for admitting fluid under pressure to said reservoir for pressurizing liquid therein, a second conduit in said housing through which liquid in said reservoir may be delivered to a device when said second conduit is open, a valve seat in said second conduit, and a valve member in said second conduit movable by pressure of liquid in said reservoir into engagement with said seat for closing said second conduit.

22. A dispenser in accordance with claim 21 in which there is a passage through said housing for delivering said fluid under pressure to said device for operating the same, and said second conduit is independent of said passage whereby liquid therein will be isolated from said fluid.

23. A dispenser in accordance with claim 21 in which there is a means for adjusting the amount of liquid which may be delivered through said second conduit when the latter is open.

24. A dispenser in accordance with claim 21 in which said valve member is spring pressed away from said seat when pressures of liquid on opposite sides of said valve member are substantially equal.

25. An air operated system comprising a source of air under pressure, a device for operation by said air, a dispenser having a closed reservoir containing a liquid, a first conduit for conveying air from said source to said device, said first conduit including a passage through said dispenser, a second conduit for admitting air from said passage to said reservoir for pressurizing the liquid therein, a third conduit for delivering liquid from said reservoir to said device, a pair of oppositely disposed valve seats in said third conduit, a liquid pressure operated valve in said third conduit between said seats and alternately seatable thereon for controlling flow of pressurized liquid from said reservoir to said device.

26. An air operated system in accordance with claim 24 in which the liquid in said reservoir is under substantially constant pressure from said air and the liquid in said third conduit downstream of said valve member is subject to fluctuating pressures due to operation of said device.

27. An air operated system in accordance with claim 24 in which the device has an expansible chamber connected to said first conduit, a valve means in said first conduit for admitting and exhausting said air under pressure to and from said chamber, and said third conduit also communicates with said chamber whereby fluctuating pressures in said chamber due to said admitting and exhausting are communicated to the liquid in said third conduit through said chamber.

References Cited in the file of this patent

UNITED STATES PATENTS

| | | |
|---|---|---|
| 1,686,310 | Beebe | Oct. 2, 1928 |
| 2,575,850 | Swickard | Nov. 20, 1951 |
| 2,889,009 | Endebak et al. | June 2, 1959 |

UNITED STATES PATENT OFFICE

CERTIFICATE OF CORRECTION

Patent No. 3,076,525              February 5, 1963

Zdenek J. Lansky et al.

It is hereby certified that error appears in the above numbered patent requiring correction and that the said Letters Patent should read as corrected below.

Column 6, line 59, for "supplied" read -- supplies --; column 8, lines 51 and 57, for the claim reference numeral "24", each occurrence, read -- 25 --.

Signed and sealed this 3rd day of September 1963.

(SEAL)
Attest:

ERNEST W. SWIDER
Attesting Officer

DAVID L. LADD
Commissioner of Patents